United States Patent Office 3,453,139
Patented July 1, 1969

3,453,139
COATED REFRACTORY SHAPES
Ernest P. Weaver, Pittsburgh, Pa., assignor to Dresser Industries, Inc., a corporation of Delaware
No Drawing. Filed Mar. 18, 1966, Ser. No. 535,341
Int. Cl. B05c 3/02; C03c 25/02
U.S. Cl. 117—113    9 Claims

ABSTRACT OF THE DISCLOSURE

A refractory shape containing a carbonaceous material that is coated with a film formed from a mixture of wax and a burnable organic material.

---

This invention relates to coated, tar-containing refractory shapes, and more particularly to basic, tar-containing refractory brick coated with a cokeable carbonaceous material.

Various types of refractories are in common use for such purposes as the construction or lining of furnaces which are operated at high temperatures. Commercially, the refractory materials are supplied as unconsolidated aggregate and as formed shapes. The refractories most commonly used may generally be classified in a few main groups, such as fireclay, high-alumina, silica and basic refractories. Basic refractories are used in large volume in the production of steel by the oxygen blowing process, and those commonly used include dead burned magnesite (magnesia MgO), dead burned dolomite ($CaO \cdot MgO$) and hard burned lime, and combinations of the same. These materials may be provided as chemically bonded unburned shapes, usually tar bonded, or ceramically bonded burned shapes impregnated with tar. The other classifications of refractories may be supplied in like manner, for example, tar bonded or tar impregnated high alumina refractories, silica refractories and the like.

Refractory shapes which do include a pitch or tar use it to provide a bond for the refractory grains and/or aid in inhibiting the hydration of the materials, particularly when dealing with dead burned dolomite, containing as it does, free lime (CaO which is not stabilized or reacted by the addition of such as silica, iron oxide and the like). The pitch or tar, also, contributes to the refractory's ability to resist chemical attack by molten slag. The tar or pitch or other non-aqueous, cokeable, carbonaceous material, upon heating, decomposes and the resultant carbon is deposited within the pores and around the grains making up the shape. The use of the tar, pitch or other carbonaceous material does not completely prevent hydration. Further, refractory shapes with some of various carbonaceous materials, evolve organic volatiles which may cause severely irritated epidermis on workers having sensitive skin.

According to one concept of the present invention, refractory shapes containing at least some free lime are coated to provide a substantially impervious skin or coating to seal in residual volatiles in the tar, pitch or other non-aqueous, cokeable carbonaceous material and to prevent absorption of moisture in the shapes, thereby reducing hydration of refractory materials. In another concept, basic refractory shapes having incorporated tar, pitch or other non-aqueous cokeable carbonaceous material are coated with an organic material which is solid at ambient temperatures and provides a barrier against moisture penetration and prevents release of volatile organic material from the shape. Preferably, the organic coating is an organic resin compatible in and dispersed throughout a paraffin wax or similar material. The coating must be tough enough to withstand handling in shipping, storage and in the actual construction of furnace elements. It must also, not be too viscous during the coating procedure, which would prevent forming a good coating.

It is, therefore, included among the objects and advantages to provide a refractory shape having incorporated therein a non-aqueous cokeable carbonaceous material with a substantially moisture-proof coating which also prevents release of volatile organic materials from said shape during handling.

A further object of the invention is to provide a method of coating refractory shapes containing non-aqueous cokeable carbonaceous material, to produce a uniform, continuous coating on the exposed surfaces of said shape.

A still further object of the invention is to provide coated basic refractory shapes which have incorporated therein a non-aqueous cokeable carbonaceous material, which coating is a tough, continuous coating over the exposed surfaces of such shapes providing a moisture barrier against external moisture and a barrier to the release of volatile organic materials from the shapes.

Further objects and advantages will be apparent from the following description and illustrative examples which are not intended to limit the spirit or scope of the invention but are intended to demonstrate the invention.

Refractory shapes, and particularly brick, are not made of a homogeneous mass of refractory particles. Such shapes are made of mixtures of size graded particles, i.e., some coarse and some fine. The use of size graded materials produces a dense pack of particles, but it, also, produces a rough surface because of the slightly protruding coarse particles, and the fine particles cannot fill all the voids and depressions on the surface. Thus, the invention provides a coating for such surfaces.

Basic refractory shapes with non-aqueous, cokeable carbonaceous material incorporated therein which may be used with the present invention may be made by known techniques. Among many others, in U.S. Patent No. 3,233,017 issued Feb. 1, 1966 to the present assignee, and U.S. Patent No. 3,215,546 issued Nov. 2, 1965 to the present assignee, there are described methods of making tar or pitch bonded refractory shapes including basic refractory shapes which are useful for the present invention. However, the invention is useful for coating refractory shapes made by other methods, for example, ceramically bonding the shapes by firing and then impregnating the shapes with pitch, tar or non-aqueous cokeable carbonaceous material as, for example, made according to U.S. Patent No. 3,106,475, also owned by the present assignee.

In one series of tests, dolomite or high lime brick were prepared and tested with several coatings, as set out below. A number of brick were prepared in accordance with the previously mentioned U.S. Patent No. 3,233,017. As is well known in the art, dead burned dolomite hydrates quite readily in the presence of moisture, as does free lime. The shapes made in accordance with said patent include size graded refractory grain and non-aqueous, cokeable carbonaceous bonding materials. For example, size graded dolomite (of a screen analysis: 30% minus 4 plus 10 mesh, 30% minus 10 plus 28 mesh, with the remainder minus 28 mesh) was mixed with powdered hard pitch. The mixed refractory grains and pitch were heated to about 500° F. and then formed into brick on a press at about 8000 p.s.i. The brick were placed in a conventional dryer, heated to about 400° F. and maintained for 13 to 16 hours at that temperature. After removal and cooling, such brick were coated with the materials indicated in Table I. The brick were then stored in a humidity cabinet at 90° F. and 85% relative humidity. The effect on the brick is set out in the following table.

TABLE

| Test No. | Coating | Time, and effect on brick |
| --- | --- | --- |
| 1 | Paraffin wax | 4 days; hydrated. |
| 2 | Latex paint | 2 days; hydrated. |
| 3 | No coating | 2 days; hydrated and crumbled. |

These tests indicated paraffin wax to be some improvement over uncoated brick, but not enough. The coating material of this invention, however, uses paraffin wax as a solvent or carrier fluid for certain selected materials hereafter listed, this mixture or solution of wax and selected material is organic and burnable. It does not have ingredients which make noxious odors during storage or during construction in confined places. It may be applied by spraying, in some instances as a hot spray, brushing or dipping. It should have a fast "set" time for economy of production.

Paraffin wax alone, in addition to not providing sufficient hydration resistance tends also to cause brick to stick together in hot weather. However, when paraffin wax is mixed with an organic resin, either synthetic or natural, to form a tough resilient coating for the refractory shapes, a satisfactory product is obtained. Usually the paraffin wax is the major ingredient of the coating mixture, on the order of 50 to 80%; however, the amount depends on the particular resin, plastic or elastomer, enough being present to form a tough film and still provide a sufficiently fluid mix to uniformly provide a continuous coating. Some of the resins, polymers, elastomers, etc. which may be combined with a wax include alkyd resins, (alkyd resins are products of glycerol and phthalic acid or anhydride) mixed copolymers of alkyds and acrylates, methacrylates, acrylonitriles, styrene and the like, epoxy resins, unsaturated polyester resins, polyethylenes, polypropylenes, polyvinylidene chloride, polyvinyl chloride and acetates, and the like. The resins, polymers, elastomers, plastic, etc. (herein also referred to as simply organic resins) are thermoplastic and generally, but not exclusively, are addition type compounds. The organic resins have a melting point in the melting range of the paraffin wax and are completely miscible, when fluid, with the melted wax. Other waxes may be used; however, for economy, the paraffin wax is preferable. Preferably the selected material goes into solution in the heated wax, However, when it merely is suspended in the molten wax, it forms a film when applied to a heated brick surface and in cooperation with the paraffin wax provides an excellent moisture and vapor barrier. Paraffin wax or its equivalent, in addition to the above detailed properties of compatibility with the selected resins, plastic or elastomer is required as the solvent or carrier since it does not evaporate upon being subjected to the temperatures necessary for application of the coating.

The wax and organic resin coating provides a very smooth covering on the brick or shapes, and the coating in the preferred thickness of from 1/32 inch to 1/16 inch thick seems to be elastic to fingernail pressure. In some cases, when a brick has been covered, some matte appearing areas may be present. The areas appear dull and dry instead of shiny as it is when the desired thickness of coating is present. These dry areas indicate the material has been absorbed into the brick and the coating is not as uniform as desired.

The coating, in an aspect of the invention, may be performed by dipping or immersing a refractory shape in a liquid mixture of a wax and an organic resin. Preferably, the wax (generally paraffin wax) is mixed with the organic resin and the mixture heated to from 300 to 400° F. In this range, the commonly available thermoplastic organic resins will melt as well as the wax. For example, polyethylene has a softening point around 230° F. and melts slightly thereabove, and is completely miscible with melted paraffin wax in the 300 to 350° F. range. The bricks are heated to 200 to 300° F. prior to immersing to prevent freezing of the mixture as the cold bricks touch it, thereby failing to form a uniform coating. The heated bricks are retained in the fluid for about a minute and then withdrawn and permitted to cool. If the bricks are too hot, they tend to drive off the paraffin or even ignite it. The exact temperature range for each mixture of wax and organic resin must be determined on the basis of amount of wax and resin present and on the physical characteristics of the resins. The amount of time of the immersion in the wax-resin mixture is determined by the time necessary for the bricks to absorb the mixture and fill the surface pores so as to produce a smooth, continuous film. A time on the order of one minute is satisfactory for most mixtures of paraffin wax and organic resin, where the amount of paraffin wax is in the range of 50 to 80%.

When coated according to the invention, the refractory shapes have a good shelf or storage life, with minimum hydration. The organic volatiles evolved at room temperature are reduced below the point which causes reactions to the majority of organic-material sensitive people. The brick and covering are stable during handling and construction. Unless otherwise stated, all size grading is by Tyler mesh screen sizes and percentages are by weight.

Having thus described the invention in detail and with sufficient particularity to enable those skilled in the art to practice it, what is desired to have protected by Letters Patent is set forth in the following claims.

I claim:

1. A refractory shape comprising an aggregate of refractory grains and a non-aqueous cokeable carbonaceous material incorporated therein formed into a useable shape, said carbonaceous material having been decomposed by heating and which releases organic vapors; a thin, continuous film coating said shape, sealing its exposed surfaces from penetration by water vapor and from release of organic vapors from said shape; said coating being a burnable organic material; said coating being characterized by being thermoplastic substantially above ambient temperatures and solid at ambient temperatures; said coating additionally being characterized by a continuous smooth surface which is elastic to fingernail pressure.

2. A refractory shape according to claim 1 in which said refractory grains are basic refractory grains including free lime.

3. A refractory shape according to claim 1 in which said coating is an organic resin selected from the group consisting of alkyd resins, epoxy resins, unsaturated polyester resins, polyethylenes, polypropylenes, and copolymers of at least 2 of alkyds, acrylates, methacrylates, acrylonitriles, and styrene.

4. A refractory shape according to claim 1 in which said coating includes paraffin wax.

5. A refractory shape according to claim 4 in which said coating includes a glyptol resin dispersed through said paraffin wax.

6. A refractory shape according to claim 1 in which said coating is a mixture of a thermoplastic, organic, elastoplastic resin and a wax.

7. A refractory shape according to claim 1 in which said coating mixture contains from 50 to 80% of wax.

8. The method of coating a refractory shape containing a non-aqeous cokeable carbonaceous material which has been decomposed by heating and which releases organic vapors comprising mixing a major quantity of a wax with a minor quantity of thermoplastic, organic elastoplastic resin; heating the resultant mixture to a temperature range of from 300–350° F. where said mixture is fluid; heating said refractory shape to a temperature range of from 200–300° F.; submerging said heated shape in said fluid for a sufficient time to fill surface pores and coat said shape with a thin, continuous film over the surface of shape; and removing said shape from said fluid and permitting the temperature of the coated shape to reduce so as to solidify said film.

9. A method according to claim 8 in which a basic refractory is coated.

References Cited

UNITED STATES PATENTS

| | | | |
|---|---|---|---|
| 3,015,850 | 1/1962 | Rusoff et al. | 264—60 |
| 3,236,680 | 2/1966 | Hnot | 117—113 |

RALPH S. KENDALL, *Primary Examiner.*

M. F. ESPOSITO, *Assistant Examiner.*

U. S. Cl. X.R.

117—123; 161